United States Patent
Puthawala

(10) Patent No.: US 6,527,942 B2
(45) Date of Patent: Mar. 4, 2003

(54) CONDITIONING SYSTEM AND METHOD FOR REDUCING THE OXYGEN CONTENT OF WATER CARRIED IN A SUBSYSTEM OF AN INDUSTRIAL PLANT

(75) Inventor: Anwer Puthawala, Buckenhof (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/811,810

(22) Filed: Mar. 19, 2001

(65) Prior Publication Data

US 2002/0074236 A1 Jun. 20, 2002

Related U.S. Application Data

(63) Continuation of application No. PCT/DE99/02949, filed on Sep. 17, 1999.

(51) Int. Cl.[7] ............................................. C02F 1/461
(52) U.S. Cl. .................. 205/743; 205/746; 205/755; 204/228.6; 204/275.1; 204/276
(58) Field of Search ................................ 205/743, 746, 205/755; 204/228.6, 275.1, 276

(56) References Cited

U.S. PATENT DOCUMENTS

| | | | | |
|---|---|---|---|---|
| 4,527,626 A | * | 7/1985 | Cantu et al. ................. | 166/275 |
| 4,830,721 A | * | 5/1989 | Bianchi et al. ............. | 204/151 |
| 4,836,929 A | * | 6/1989 | Baumann et al. ........... | 210/638 |
| 5,190,627 A | | 3/1993 | Saito et al. | |
| 5,447,640 A | | 9/1995 | Omi et al. | |
| 5,796,799 A | * | 8/1998 | Kobayashi et al. ......... | 376/306 |
| 6,126,811 A | * | 10/2000 | Barbier et al. ............. | 205/746 |

* cited by examiner

Primary Examiner—Arun S. Phasge
(74) Attorney, Agent, or Firm—Laurence A. Greenberg; Werner H. Stemer; Gregory L. Mayback

(57) ABSTRACT

A conditioning system for reducing an oxygen content of water carried in a subsystem of an industrial plant includes an electrolysis unit having a hydrogen side, an anode, and a cathode. The anode and cathode are connected to the subsystem to decompose water into hydrogen and oxygen. A hydrogen/oxygen recombination catalyst is connected to the subsystem. The hydrogen/oxygen recombination catalyst follows the anode and cathode on the hydrogen side. A method for lag reducing an oxygen content of water carried in a subsystem of an industrial plant, includes the steps of electrolytically decomposing water from a subsystem of an industrial plant into hydrogen and oxygen, and using the hydrogen generated at the same time for recombining the oxygen contained in the water.

10 Claims, 1 Drawing Sheet

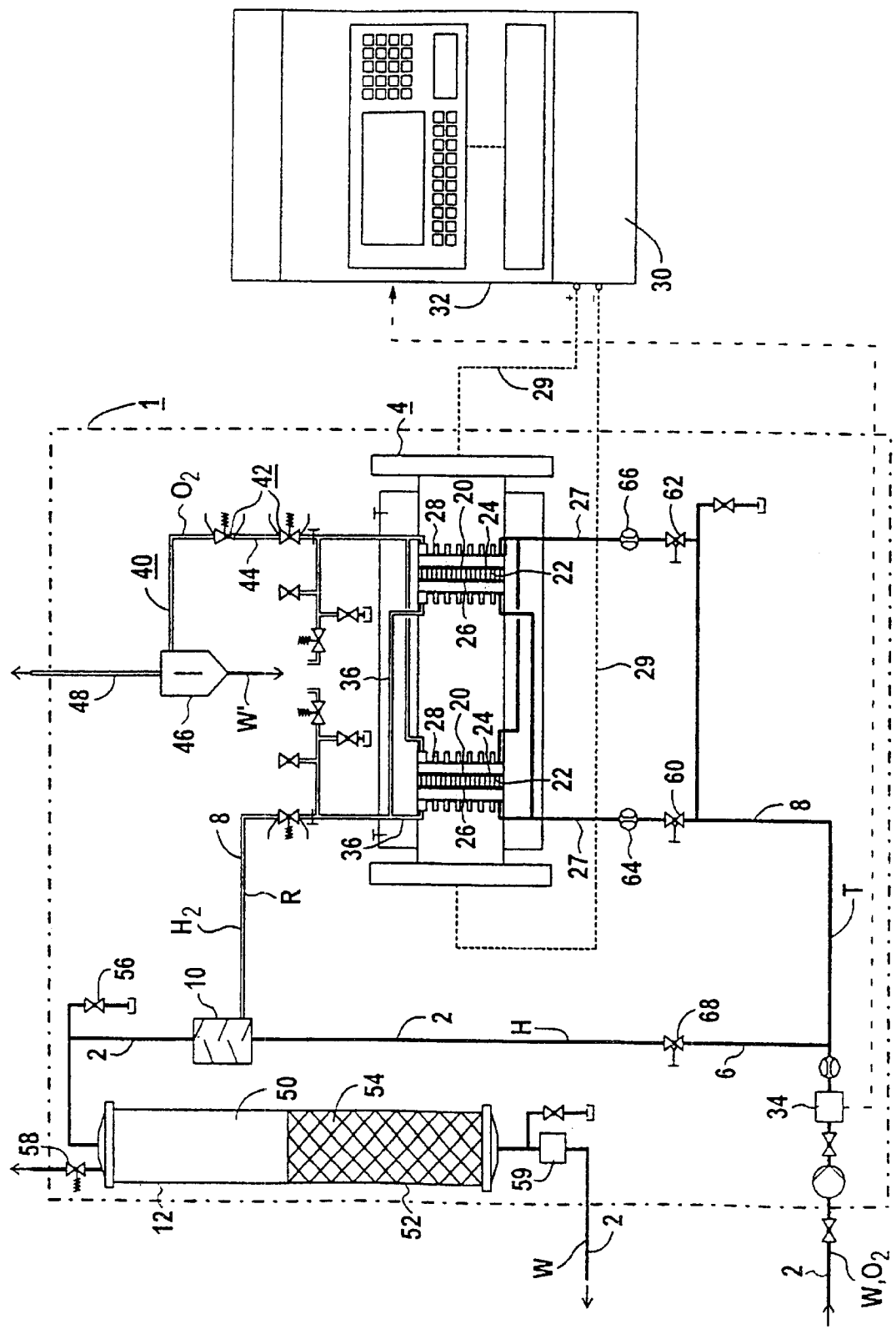

ial plant.

CONDITIONING SYSTEM AND METHOD FOR REDUCING THE OXYGEN CONTENT OF WATER CARRIED IN A SUBSYSTEM OF AN INDUSTRIAL PLANT

CROSS-REFERENCE TO RELATED APPLICATION

This application is a continuation of copending International Application No. PCT/DE99/02949, filed Sep. 17, 1999, which designated the United States.

BACKGROUND OF THE INVENTION

Field of the Invention

The invention relates to a conditioning system and to a method for reducing the oxygen content of water carried in a subsystem of an industrial plant.

Subsystems in which water is carried are provided in a multiplicity of industrial plants, for example, in chemical production workshops or in nuclear or fossil-fuel power plants. Such a subsystem may be, for example, a cooling circuit or a circulating circuit for the working medium.

In such a context, a high oxygen concentration in the water carried in the subsystem may lead to a corrosion of fittings or of pipes of the subsystem. To avoid damage to the subsystem or else to the entire industrial plant reliably, therefore, it may be necessary, as required, to reduce the oxygen content of the water carried in the subsystem. The requirement may arise, in particular, when the water is subjected continuously to oxygen for operational or conceptual reasons.

For example, it may be necessary for the intermediate cooling circuit of a nuclear plant to have a compensating tank for the water carried in the intermediate cooling circuit, the water coming into contact with ambient atmosphere in the manner of an open configuration in the interior of the tank. The continuous introduction of oxygen into the intermediate cooling circuit caused thereby may lead to an oxygen concentration in the water carried there of, for example, up to 8 ppm (parts per million). For reasons of corrosion protection, however, it may be necessary, in spite of the continuous introduction of oxygen, to keep the oxygen content in the water carried in the intermediate cooling circuit permanently at a value of less than 20 ppb (parts per billion).

For such a purpose, in an intermediate cooling circuit of a nuclear plant, there normally is a provision for an on-demand feed of the water carried there with hydrazine ($N_2H_4$). The hydrazine reacts with the oxygen contained in the water to form nitrogen ($N_2$) and water ($H_2O$), so that the oxygen content of the water is lowered significantly. However, precisely in the case of a plant with continuous oxygen introduction, a more or less permanent addition of hydrazine is necessary, so that more and more nitrogen is formed in the water. The additional formation leads to a continuous rise in the conductivity of the water and, therefore, to a permanent change in the water chemistry. At the same time, for operational reasons, when predetermined conductivity limits are exceeded or when a predetermined PH value is exceeded, a complete exchange of the water carried in the respective subsystem of the industrial plant is necessary. Precisely where complex industrial plants are concerned, a complete water exchange is highly complicated and, moreover, entails undesirably long standstill times of the plant.

Alternatively, on-demand vacuum degassing of the water may be provided to set a low oxygen content in the water.

Such a concept, however, involves a high outlay, particularly in terms of the components required.

SUMMARY OF THE INVENTION

It is accordingly an object of the invention to provide a conditioning system and method for reducing the oxygen content of water carried in a subsystem of an industrial plant that overcomes the hereinafore-mentioned disadvantages of the heretofore-known devices and methods of this general type and that makes it possible, at particularly low outlay in structural and technical terms, to have a reliable on-demand setting of the oxygen content in the water below a predeterminable limit value.

With the foregoing and other objects in view, there is provided, in accordance with the invention, a conditioning system for reducing an oxygen content of water carried in a subsystem of an industrial plant, including an electrolysis unit having a hydrogen side, an anode, and a cathode, the anode and the cathode connected to the subsystem to decompose water into hydrogen and oxygen, and a hydrogen/oxygen recombination catalyst connected to the subsystem, the hydrogen/oxygen recombination catalyst following downstream the anode and the cathode on the hydrogen side.

The invention relates to a treatment system for reducing the oxygen content of the water that is guided in a subsystem of a technical installation. The aim of the invention is to provide a reliable way of adjusting the oxygen content of the water below a predetermined limit value, as required. The invention strives to be as simple as possible in constructional and technical terms. To such an end, an electrolysis unit for decomposing a portion of the water into hydrogen $H_2$ and oxygen $O_2$ is connected to the subsystem. A hydrogen-oxygen recombination catalyzer that is connected to the subsystem is connected downstream of the electrolysis unit on the hydrogen side.

The invention achieves its objectives, with respect to the conditioning system, by connecting an anode and cathode of an electrolysis unit to the subsystem to decompose water into hydrogen and oxygen. They are followed downstream on the hydrogen side by a hydrogen/oxygen recombination catalyst connected into the subsystem.

The invention proceeds from the notion that a reliable setting of a low oxygen content in the water is possible at particularly low outlay by subjecting the oxygen to a reaction, the products of which not adversely changing the water chemistry. Oxygen is recombined with hydrogen, in which the sole final product is water. Feeding with hydrogen as a reaction partner for the oxygen takes place on demand through the electrolysis unit, followed by the hydrogen/oxygen recombination catalyst to ensure a complete conversion of the hydrogen fed therein.

Expediently, the electrolysis unit is provided for decomposing a partial quantity of the water carried in the subsystem and, for such a purpose, is likewise connected on the inlet side to the subsystem. Water from the subsystem can be supplied to the anode and cathode of the electrolysis unit. The terms "anode" and "cathode" as used herein also refer to a plurality of anodes and cathodes. The electrolysis unit may, at the same time, particularly for compensating volume losses, be capable of being fed additionally with water from a separate water reservoir in which the water can be kept, for example, as deionized water.

At the same time, in a particularly advantageous refinement, the hydrogen/oxygen recombination catalyst includes, as catalytically active components, a number of polymer beads provided with a palladium layer, such as are described, for example, in a prospectus from the Bayer company titled "Katalytische Entfernung von gelöstem $O_2$ aus Wasser" ["Catalytic removal of dissolved $O_2$ from water"], No. OC/I 20 377, October 1995.

In accordance with another feature of the invention, the electrolysis unit includes a number of membrane-type electrolysis cells. In such a membrane-type electrolysis cell, the functional principle of a fuel cell, such as is disclosed, for example, from the paper "Brennstoffzellen für Elektrotraktion" ["Fuel cells for electrotraction"], K. Straßer, VDI-Berichte [VDI Reports], No. 912 (1992), page 125 ff., is reversed. Water is supplied to a membrane disposed between an anode and a cathode. By applying a supply voltage between the anode and the cathode, the water is decomposed electrolytically into hydrogen and oxygen. Such a membrane-type electrolysis cell is distinguished by a particularly compact form of construction, so that an electrolysis unit with a number of membrane-type electrolysis cells can be accommodated in a particularly confined space. Consequently, the an electrolysis unit can be connected into the subsystem in a particularly flexible way and so as to be adapted to the specific needs of the subsystem.

In an advantageous refinement, a discharge system for oxygen is connected to the electrolysis unit. Particularly, the electrolysis unit has an oxygen side, and the oxygen discharge system is connected to the oxygen side of the electrolysis unit. Thus, the oxygen generated during the decomposition of the partial quantity of water can be discharged or supplied for another use in a particularly simple way.

In accordance with an added feature of the invention, the electrolysis unit has an inlet side and an outlet side. Advantageously, the electrolysis unit is connected into a branch line connected on the inlet side and the outlet side to the subsystem. The partial stream of the water carried by the branch line and, therefore, the feed of the electrolysis unit with water to be decomposed, can be adapted in a particularly flexible way to the hydrogen quantity to be generated, without the occurrence of significant adverse effects on the main water stream circulating in the subsystem. Particularly due to the high effectiveness of the electrolytic decomposition of the partial quantity of water, the branching ratio selected between the partial stream of water carried by the branch line and the main stream of water carried in the subsystem may be comparatively low. To reduce the oxygen content of water carried in an intermediate cooling circuit of a nuclear plant from about 8 ppm to less than about 10 ppb, there may be, at the same time, a leading of only a partial stream of about 10 liters per hour through the branch line, in the case of a water stream of, for example, about 300 liters per hour carried in the intermediate cooling circuit.

In such a configuration, to achieve a particularly homogeneous distribution of the generated hydrogen in the main stream of water and, therefore, particularly high efficiency in the subsequent catalytic recombination, in a further advantageous refinement, the branch line issues on the outlet side into the subsystem in a static mixer.

For an on-demand and, therefore, particularly accurate generation of the hydrogen provided for reducing the oxygen content, the electrolysis unit is expediently assigned a set-point transmitter connected on the input side to a measuring probe for determining the oxygen content of the water. The measuring probe may be connected into the subsystem or else into the branch line. The set-point transmitter advantageously acts on a voltage source provided for supplying voltage to the electrolysis unit. Thus, the generation of the hydrogen can be carried out based on an actual value of the oxygen content in the water and, therefore, particularly on demand.

To check reliably the effectiveness of the catalytic recombination and, therefore, of the reduction in the oxygen content, the hydrogen/oxygen recombination catalyst is advantageously followed in the subsystem by a further measuring probe for determining the oxygen content of the water.

With the objects of the invention in view, there is also provided a method for reducing an oxygen content of water carried in a subsystem of an industrial plant, including the steps of electrolytically decomposing water from a subsystem of an industrial plant into hydrogen and oxygen, and using the hydrogen generated at the same time for recombining the oxygen contained in the water.

The method according to the invention achieves it objectives by decomposing water from the subsystem electrolytically into hydrogen and oxygen and using the hydrogen generated at the same time for recombining the oxygen contained in the water. In particular, a partial quantity of the water from the subsystem is decomposed. The water from the subsystem is supplied both to the anode and to the cathode of the electrolysis unit.

For an on-demand and, therefore, particularly flexible reduction in the oxygen content, the electrolytic decomposition of the partial quantity of the water from the subsystem is advantageously controlled by a measurement value characterizing the oxygen content of the water.

In accordance with a concomitant mode of the invention, water is branched off from the subsystem, is led through an electrolysis unit, and, together with hydrogen generated as a result of the decomposition of the water, is fed back into the subsystem. As much hydrogen as is required for recombining the oxygen contained in the water of the subsystem is generated in the electrolysis unit and is characterized by the measurement value.

The advantages achieved by the invention are, in particular, that a reliable reduction in the oxygen content in the water is ensured by the water being fed with hydrogen and by the subsequent catalytic recombination, a change in the water chemistry being reliably avoided even during continuous operation. Moreover, the on-demand generation of hydrogen in the electrolysis unit ensures, in a simple way, that the hydrogen is supplied to the subsystem without complicated measures for keeping a hydrogen reservoir being necessary. Corrosion of components connected into the subsystem is, therefore, reliably avoided in a simple way, and, in particular, there is also no need for a frequent complete exchange of the water carried in the subsystem.

Other features that are considered as characteristic for the invention are set forth in the appended claims.

Although the invention is illustrated and described herein as embodied in a conditioning system and method for reducing the oxygen content of water carried in a subsystem of an industrial plant, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

BRIEF DESCRIPTION OF THE DRAWINGS

The FIGURE is a diagrammatic illustration of a conditioning system for reducing the oxygen content of water carried in a subsystem of an industrial plant according to the invention.

DESCRIPTION OF THE PREFERRED EMBODIMENTS

In the exemplary embodiment, the subsystem 2 is an intermediate cooling circuit of a nuclear plant. However, the subsystem 2 may also be any other subsystem of an industrial plant, in which a reduction in the oxygen content is necessary or desirable for various reasons, for example, for corrosion protection or to maintain a predetermined oxygen limit value.

Referring now to the single FIGURE of the drawing, it is seen that a conditioning system 1 includes an electrolysis unit 4 connected into a branch line 8 branching off from a pipe line 6 of the subsystem 2. A partial stream T of the water W carried in the subsystem 2 can be supplied to the electrolysis unit 4 through the branch line 8. In addition, however, water from a non-illustrated water reservoir may also be supplied, for example, as deionized water, to the electrolysis unit 4. The electrolysis unit 4 is provided for decomposing a partial quantity of the partial stream T and, therefore, of the water W into hydrogen $H_2$ and oxygen $O_2$. The electrolysis unit 4 is connected on the outlet side into the branch line 8 such that the hydrogen $H_2$ obtained during decomposition can be supplied to the subsystem 2 together with the residual water R not decomposed in the electrolysis unit 4.

The electrolysis unit 4 may be preceded on the inlet side in the branch line 8 by a non-illustrated filter system. The incoming stream of ballast materials or impurities harmful to the functioning capacity of the electrolysis unit 4 into the electrolysis unit 4 can be effectively prevented by such a filter system.

The branch line 8 issues on the outlet side into the subsystem 2 in a static mixer 10. Downstream of the static mixer 10, in the direction of flow of the water W, a hydrogen/oxygen recombination catalyst 12 is connected into the subsystem 2. In other words, the hydrogen/oxygen recombination catalyst 12 follows downstream the electrolysis unit 4 on the hydrogen side through the branch line 8 and through the static mixer 10.

The electrolysis unit 4 includes a number of membrane-type electrolysis cells 20. In the exemplary embodiment according to the FIGURE, two membrane-type electrolysis cells 20 are illustrated. Alternatively, however, only one membrane-type electrolysis cell 20 or several membrane-type electrolysis cells 20 may also be provided. In each membrane-type electrolysis cell 20, a membrane 22 made of a polymeric electrolyte is disposed between an anode 24 and a cathode 26. For particularly high resistance to corrosion, the anodes 24 and the cathodes 26 are preferably made of precious metal, such as platinum and/or iridium. However, other materials may also be provided.

For supplying water W to the membrane-type electrolysis cells 20, the branch line 8 branches into a corresponding number of supply lines 27, each of which respectively issues into a water duct system 28 of the associated membrane-type electrolysis cell 20.

The anodes 24 and the cathodes 26 are connected to a voltage source 30 through an electrical line system 29. For controlling the production of hydrogen and oxygen in the electrolysis unit 4, the voltage source 30 is connected to a set-point transmitter 32 of the electrolysis unit 4. The set-point transmitter, in turn, is connected on the input side to a measuring probe 34, connected into the subsystem 2, for determining the oxygen content of the water W.

For feeding the hydrogen $H_2$ into the subsystem 2, each membrane-type electrolysis cell 20 is connected on the outlet side to a hydrogen line 36. The hydrogen lines 36 are brought together at a suitable point and together form the outlet-side part of the branch line 8.

On the oxygen side, a discharge system 40 for the oxygen $O_2$ is connected on the outlet side to the electrolysis unit 4. The discharge system 40 includes an oxygen line 44 that can be shut off by a valve configuration 42 and that issues into a water separator 46. Water W' separated in the water separator 46 can be supplied to a water sump and, therefore, for possible reuse. The oxygen $O_2$ separated from the water W' in the water separator 46 can be supplied through a venting line 48 to a non-illustrated venting system.

The hydrogen/oxygen recombination catalyst 12 following the electrolysis unit 4 on the hydrogen side includes a catalyst pipe 50 that, for example, when the conditioning system 1 is used for an intermediate cooling circuit of a nuclear plant, has a height of about 2 m and a diameter of about 0.4 m. Disposed in a lower region 52 of the catalyst pipe 50 are catalyst bodies 54 that, in the exemplary embodiment, are made of polymer beads doped with palladium. Moreover, the hydrogen/oxygen recombination catalyst 12 is connected to a venting and sampling valve 56 and also to an overflow valve 58.

To set a predeterminable branching ratio between the partial stream T of water W flowing through the branch line 8 and the main stream H of water W flowing through the pipe line 6, valves 60, 62 and throughflow measuring devices 64, 66 are connected into the branch line 8 branched into the supply lines 27 and a further valve 68 is connected into the pipe line 6. At the same time, depending on the system requirements, the branching ratio selected may be such that, in the case of a main stream H flowing through the pipe line 6 of about 300 l/h, the partial stream flowing through the branch line 8 is only about 10 l/h.

A further measuring probe 59 for determining the oxygen content of the water W is connected into the subsystem 2 downstream of the hydrogen/oxygen recombination catalyst 12, as seen in the direction of flow of the water W.

When the subsystem 2 of the industrial plant is in operation, the oxygen content of the water W carried in the subsystem 2 is monitored through the measuring probe 34. If the oxygen content exceeds a predeterminable limit value of, for example, 2 ppm, the conditioning system 1 for reducing the oxygen content in the water W is activated. For such a purpose, the partial stream T of water W is supplied to the electrolysis unit 4 through the branch line 8. By applying a voltage through the voltage source 30, a partial quantity of the water W supplied to the electrolysis unit 4 is decomposed electrolytically into hydrogen $H_2$ and oxygen $O_2$. The decomposition rate is set as a function of the stream supplied to the electrolysis unit 4, which, in turn, is set by the set-point transmitter 32 as a function of a measurement value characterizing the oxygen content in the water W determined by the measuring probe 34. By a suitable choice of parameters, a metered decomposition of water W into hydrogen $H_2$ and oxygen $O_2$ is possible such that exactly the necessary quantity of hydrogen $H_2$ is provided, within predeterminable tolerance limits, for recombining the undesirable oxygen $O_2$ in the water W.

The hydrogen $H_2$ generated as a result of the decomposition of the partial quantity of water W is led, together with undecomposed residual water R, into the subsystem 2 through the branch line 8. Feeding takes place in the static mixer 10, so that a particularly homogeneous distribution of the generated hydrogen $H_2$ in the main stream H of water W is ensured. The water W fed with hydrogen $H_2$ then flows to the hydrogen/oxygen recombination catalyst 12, where, triggered by the catalyst bodies 54, a catalytic recombination of the hydrogen $H_2$ with the undesirable oxygen $O_2$ carried in the water W takes place. The hydrogen $H_2$ reacts with the oxygen $O_2$ to form water so that no contamination or pollution of the water W with other reaction products occurs.

The water W flowing out from the hydrogen/oxygen recombination catalyst 12 is examined by the further measuring probe 59 for residual oxygen possibly remaining. The measurement value for the oxygen content, delivered by the further measuring probe 59, may be used for readjusting the set-point transmitter 32.

The oxygen $O_2$ likewise generated during the operation of the electrolysis unit 4 is first separated from the entrained water W' by the discharge system 40 and is then supplied to the venting system.

By the on-demand generation of the hydrogen $H_2$ and the subsequent recombination of the hydrogen $H_2$ with the undesirable oxygen $O_2$ carried in the water W to form water, a reliable reduction in the oxygen content in the water W is possible in a particularly simple way. In particular, an original oxygen content in the water W of, for example, about 8 ppm can be reduced in a simple and reliable way to an oxygen content of, for example, less than about 10 ppb. The conditioning system 1, thus, reliably prevents corrosion in the subsystem 2 in a simple way, without making necessary a complete exchange of the water W carried in the latter at regular intervals for such a purpose.

I claim:

1. A conditioning system for reducing an oxygen content of water carried in a subsystem of an industrial plant, comprising:

an electrolysis unit having a hydrogen side, an anode, and a cathode, said anode and said cathode connected to the subsystem to decompose water into hydrogen and oxygen; and a hydrogen/oxygen recombination catalyst connected to the subsystem, said hydrogen/oxygen recombination catalyst following said anode and said cathode on said hydrogen side;

a branch line through which said electrolysis unit is connected to an inlet side and an outlet side of the subsystem.

2. The conditioning system according to claim 1, wherein said electrolysis unit includes membrane electrolysis cells.

3. The conditioning system according to claim 1, wherein said electrolysis unit has an oxygen side, and an oxygen discharge system is connected to said oxygen side of said electrolysis unit.

4. The conditioning system according to claim 1, including a static mixer, said branch line opening into the subsystem in said static mixer.

5. The conditioning system according to claim 1, wherein said electrolysis unit has an inlet side, and including:

a measuring probe for determining an oxygen content of the water in the subsystem; and a set-point transmitter for said electrolysis unit, said set-point transmitter having an input connected to said measuring probe.

6. The conditioning system according to claim 5, including a further measuring probe for determining the oxygen content of the water, said further measuring probe following said hydrogen/oxygen recombination catalyst in the subsystem.

7. The conditioning system according to claim 1, including a measuring probe for determining the oxygen content of the water, said measuring probe following said hydrogen/oxygen recombination catalyst in the subsystem.

8. A method for reducing an oxygen content of water carried in a subsystem of an industrial plant, which comprises:

providing an electrolysis unit;

providing a branch line through which the electrolysis unit is connected to an inlet side and an outlet side of the subsystem;

in the electrolysis unit, electrolytically decomposing water from the subsystem of an industrial plant into hydrogen and oxygen; and using the hydrogen generated at the same time for recombining the oxygen contained in the water.

9. The method according to claim 8, which further comprises controlling the electrolytic decomposition of the water from the subsystem by a measurement value characterizing an oxygen content of the water.

10. The method according to claim 9, which further comprises branching the water off from the subsystem by the branch line;

leading the water through the electrolysis unit;

feeding the water together with hydrogen generated as a result of the decomposition of the water back into the subsystem; and generating as much hydrogen in the electrolysis unit as is required for recombining the oxygen contained in the water of the subsystem and characterized by the measurement value.

* * * * *

UNITED STATES PATENT AND TRADEMARK OFFICE
CERTIFICATE OF CORRECTION

PATENT NO.    : 6,527,942 B2
DATED         : March 4, 2003
INVENTOR(S)   : Anwer Puthawala It is certified that error appears in the above-identified patent and that said Letters Patent is hereby corrected as shown below:

<u>Title page,</u>
Item [30], should read as follows:

-- Foreign Application Priority Data

Sep. 18, 1998          (DE)          ………. 198 42 930.4 --

Signed and Sealed this

Twenty-second Day of July, 2003

JAMES E. ROGAN
*Director of the United States Patent and Trademark Office*